(12) United States Patent
Fukazawa

(10) Patent No.: US 6,655,588 B2
(45) Date of Patent: Dec. 2, 2003

(54) CARD SYSTEM, IC CARD AND CARD READER/WRITER USED FOR THE CARD SYSTEM

(75) Inventor: Hiroshi Fukazawa, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/916,944

(22) Filed: Jul. 27, 2001

(65) Prior Publication Data

US 2002/0020744 A1 Feb. 21, 2002

(30) Foreign Application Priority Data

Jul. 28, 2000 (JP) ........................................ 2000-229629

(51) Int. Cl.[7] .............................................. G06K 5/00
(52) U.S. Cl. ...................................................... 235/437
(58) Field of Search ................................ 235/437, 492; 395/825; 371/29.1

(56) References Cited

U.S. PATENT DOCUMENTS

| | | | | |
|---|---|---|---|---|
| 5,101,410 A | * | 3/1992 | Niimura et al. | ............. 235/380 |
| 5,170,046 A | * | 12/1992 | Kusakabe | .................... 235/380 |
| 5,727,230 A | * | 3/1998 | Fujioka | ........................ 710/20 |
| 6,181,981 B1 | * | 1/2001 | Varga et al. | ................ 700/236 |

FOREIGN PATENT DOCUMENTS

| | | |
|---|---|---|
| JP | 62-187954 | 8/1987 |
| JP | 5-28099 | 2/1993 |
| JP | 5-28100 | 2/1993 |
| JP | 7-44490 | 2/1995 |
| JP | 9-179948 | 7/1997 |
| JP | 10-71790 | 3/1998 |

* cited by examiner

Primary Examiner—Karl D. Frech
Assistant Examiner—Lisa M. Caputo
(74) Attorney, Agent, or Firm—Scully, Scott, Murphy & Presser

(57) ABSTRACT

A card system having an IC card and a card reader/writer wherein when data is transmitted and received over a signal line between the IC card and the card reader/writer for reading or writing of the data, a data transmitting side transmits a parity based upon content of the data together with the data over the signal line and a data receiving side checks whether or not there is any error in reception of data based upon content of the a data and the parity received to transmit back to the data transmitting side a data retransmission request signal for requesting the data transmitting side to retransmit the data when there is an error; and wherein the IC card corrects a level of the signal line for requesting the data transmitting side to transmit next data when it is verified that there is no error in the reception of the data based upon content of the data and the parity received by the data receiving side.

19 Claims, 15 Drawing Sheets

CARD SYSTEM, IC CARD AND CARD READER/WRITER USED FOR THE CARD SYSTEM

FIELD OF THE INVENTION

The present invention relates to a card system, and an integrated circuit (IC) card and a card reader/writer both used for the card system. In particular, the present invention relates to a card system in which an IC card, such as a JAVA card which is capable of transmitting and receiving data at a high rate, and a card reader/writer are used.

The present invention relates to a card system, and an IC card and a card reader/writer both used for the card system. In particular, the present invention relates to a card system in which a card, such as a JAVA card which is capable of transmitting and receiving data at a high rate, is used, and an IC card and a card reader/writer used for the card system.

BACKGROUND OF THE INVENTION

Magnetic cards have heretofore been used for many of the cash cards and the credit cards. Recently, counterfeiting of magnetic cards has been increased. Employing an IC card in lieu of a magnetic card has attracted attention. An IC card has an internal CPU for processing encryption and decipherment so that counterfeiting of the IC card is more difficult in comparison with the magnetic card. Much information can be stored in an IC card, and hence many of the IC cards are equipped with multi-functions.

A conventional card system will be described with reference to FIG. 1 which illustrates a diagram of a IC card system to which the present invention is applied. FIG. 1 illustrates a diagram showing structures of an IC card 10 and an IC card reader/writer 20 for reading information from the IC card 10 and/or recording information on the IC card 10. The IC card reader/writer 20 comprises a port terminal (PORT) 22 from and to which data is input and output, a clock terminal (CLOCK) 23 for outputting a clock signal for counting input and output timings of data, a reset terminal (RESET) 24 for outputting a reset signal which initiates operation of a CPU 11 located in the IC card 10, a power supply terminal ($V_{DD}$) 25 for supplying power to drive the CPU 11 in the IC card 10 and a ground terminal (GND) 26.

The IC card reader/writer 20 further comprises a CPU 28 for controlling various signals which are output to terminals 22 to 26, a power supply 21 for driving the CPU 28 and a pull-up resistor 27 connected between the power supply 21 and the port terminal 22. The IC card 10 comprises terminals 12 to 16 which correspond to the terminals 22 to 26 of the IC card reader/writer 20, respectively, through which various signals are input to and output from the IC card 10. The IC card 10 further comprises a memory 17 for storing a program for carrying out half-duplex synchronous communication and user data, and a CPU 11 for executing the program stored in the memory 17.

A term "half-duplex" used herein means a communication scheme for alternatingly transmitting data between two communication equipments to enable bi-directional communications. When one of the equipments transmits data, another equipment receives the data. Simultaneous transmission of data by both equipments is not allowed. For example, when data is output from the IC card reader/writer 20, the IC card 10 can not output data to the IC card reader/writer 20 and only receives data from the IC card reader/writer 20.

Operation of a system shown in FIG. 1 will be described. When the IC card 10 is mounted to the IC card reader/writer 20, power VDD is supplied to a main body of the IC card 10 through the power supply terminals 25 and 15 in response to an instruction from the CPU 28. More specifically, when the power supply terminal 25 and the ground terminal 26 are electrically connected with the power supply terminal 15 and the ground terminal 16, respectively, the CPU 11 is enabled to be driven.

Thereafter, a reset signal is output from the IC card reader/writer 20 via the reset terminal 24 in accordance with an instruction from the CPU 28. Then, a reset signal is supplied to the IC card 10 via the reset terminal 14 and in turn provided to the CPU 11. This brings the CPU 11 into such a state that the CPU 11 can be initiated to operate.

Subsequently, the IC card reader/writer 20 outputs a clock signal via the clock terminal 23 in accordance with an instruction from the CPU 28. Then, the output clock is provided to the CPU 11 of the IC card 10 via the clock terminal 13. Then, IC card reader/writer 20 outputs a data read request, and data which is to be written into the IC card 10, via the port terminal 22 in synchronization with a clock signal being output.

On the IC card 10, the CPU 11 reads out user data stored in the memory 17 to output the user data to the IC card reader/writer 20, and writes data supplied from the IC card reader/writer 20 into the memory 17 based upon the request and data which have been received by the IC card 10 in accordance with a scheme of half-duplex synchronous communication.

FIGS. 8 and 9 illustrate data formats used for the half-duplex synchronous communication. FIG. 8 illustrates data format when data communication is normally conducted and FIG. 9 illustrates data format when data communication is not normally conducted.

As shown in FIG. 8, a start bit which informs of transmission of data bits, data bits D0 through D7 which constitute substantially transmitted and received data and a parity bit from which it is checked whether the data has been correctly transferred are transmitted between the IC card reader/writer 20 and the IC card 10.

When the data communication has not been normally conducted as shown in FIG. 9, a data retransmission request signal is transmitted between the IC card reader/writer 20 and the IC card 10 for requesting a transmitting side to retransmit the data. In FIGS. 8 and 9, the clock signal comprises, for example, 512 pulses in each period. Each data transmitted and received at a $V_{DD}$ level or a Ground level.

The IC card reader/writer 20 and IC card 10 are controlled by the CPUs 28 and 11, so that each of the IC card reader/writer 20 and IC card 10 is brought in a state of an output mode for transmitting data or an input mode for receiving data, whilst both of the IC card reader/writer 20 and IC card 10 are not simultaneously brought into the output mode in order to carry out half-duplex data communication.

Operations of the IC card reader/writer 20 and the IC card 10 when data is normally transmitted from the IC card reader/writer 20 to the IC card 10 will be described.

As shown in FIG. 8, the IC card reader/writer 20 which is functioning as a data transmitting side in half-duplex communication is controlled by the CPU 28 so that it is brought into the output mode in periods T0 to T9 and input mode and in periods T10 and T11, respectively. More specifically, (1) a start bit is transmitted in the beginning of T0.
(2) Data bits D0 to D7 are transmitted at T1 to T8, respectively.

(3) At T9, a parity bit having "0" or "1" which is determined depending upon data bits is transmitted.

(4) When a data retransmission request signal is transmitted at T10 and T11, the IC card reader/writer 20 is controlled to be able to receive the signal.

The IC card 10 which is functioning as a data receiving side in half-duplex communication is controlled so that it is brought into the input mode at all periods T0 to T11. More specifically, (1) a start bit is received at T0.

(2) Data bits are received at T1 to T8.

(3) A parity bit is received at T9.

(4) The IC card 10 executes parity check with reference to the parity which has been received at T10, and T11. Since no error occurs, no data retransmission request signal is transmitted and information comprised of data bits D0 to D7 is stored in the memory 17.

Thus, the IC card reader/writer 20 functioning as a data transmitting side and the IC card 10 functioning as a data receiving side are brought into the input mode at periods T10 and T11, and the port terminals 12 and 22 are fixed at a $V_{DD}$ level by the pull-up resistor 27 located in the card reader/writer 20.

When the data has not been normally transmitted from the IC card reader/writer 20 to the IC card 10, the IC card reader/writer 20 functioning as a data transmitting side is brought into the output and input modes at periods T0 to T9 and T10 to T12, respectively, as shown in FIG. 9. More specifically, (1) a start bit is transmitted at T0.

(2) Data bits are transmitted at T1 to T8.

(3) A parity bit is transmitted at T9.

(4) A data retransmission request signal transmitted is received at part of a period of T10, and at T11.

The IC card 10 functioning as a data receiving side is controlled so that it is brought into the input mode from period T0 to an intermediate point of T11 and at T12 and is brought into the output mode at an intermediate point of a period of T10 and at T11. More specifically, (1) a start bit is received at T0.

(2) Data bits are received at T1 to T8.

(3) A parity bit is received at T9.

(4) The IC card 10 executes parity check with reference to the parity bit at timing including T10.

In this case, an error occurs, and hence the data retransmission request signal is transmitted back to the IC card reader/writer 20. When the IC card reader/writer 20 receives this signal, it retransmits the data to the IC card 10.

Accordingly, at timings excluding a part of T10, and T11 the IC card reader writer 20 functioning as a data transmitting side as well as the IC card 10 functioning as a data receiving side are in the input mode and the port terminals 12 and 22 are fixed at the $V_{DD}$ level by the pull-up resistor 27 located in the card reader/writer 20.

By using the above-mentioned protocol, data communication is carried out between the IC card 10 and the IC card reader/writer 20.

SUMMARY OF THE DISCLOSURE

Data communication above described is suited for data communication at a rate such as 9600 bps. However it is not suited for a high speed data communication, a rate of which is for example 1228800 bps as is adopted in JAVA card in view of delayed speed of data.

FIG. 10 illustrates an operation of a system in a case wherein no data retransmission request signal is transmitted or received with a parity bit of "1" using the format as shown in FIG. 8 and data communication is conducted at a rate such as 1228800 bps. FIG. 11b illustrates an operation of a system in a case wherein no data retransmission request signal is transmitted or received with a parity bit of "0" using the format as shown in FIG. 8 and data communication is conducted at a rate such as 1228800 bps. FIG. 11a illustrates an operation of a system in a case wherein no data retransmission request signal is transmitted or received with a parity bit of "0" using the format as shown in FIG. 8 and data communications are conducted at a rate such as 9600 bps.

The data transfer rate in FIGS. 10 and 11a, that is, one period of each of T0 to T12 is, for example, 103 $\mu$s(microsecond). A clock signal in one period comprises 512 pulses. One period of each of T0 to T12 in FIG. 11b is, for example, 810 nS. The clock signal in one period comprises four pulses.

The data is transmitted in a $V_{DD}$ level in an interval of T9 to T11 as shown in FIG. 10 if a parity bit is "1". No problem occurs unlike the case in FIG. 11a. If the parity bit is "1", the data is similarly transmitted in the $V_{DD}$ level in the interval of T9 to T11 as in case of data communication at a rate such as 9600 bps, so that no problem occur. This reason resides in that a rising edge of a data pulse up to the $V_{DD}$ level is not made to become dull by a delay time of the data.

The data is transmitted via the pull-up resistor 27 from the port terminal 22 at time of T10 as shown in FIG. 11a. At this time, a rising edge of a data pulse becomes dull. However, since the data pulse becomes the VDD level before the data is actually input form a transmitting side, presence or absence of an error signal can be accurately detected.

On the other hand, data may not come to the $V_{DD}$ level at T10 as well as at T11 when data communication is carried out at a high rate as shown in FIG. 11b. This makes it difficult to accurately detect presence or absence of an error signal since the data will not completely reach to the $V_{DD}$ level by a time when the data is actually input from a transmitting side.

FIGS. 12 and 13 show cases shown in FIG. 9, wherein a data retransmission request signal is transmitted when a parity bit is "1". FIG. 12 shows an operation in a case wherein data communication is conducted at a high rate such as 1228800 bps. A data transfer rate in FIGS. 12 and 13 is the same as that in FIGS. 11a and 11b.

A data signal rises to a $V_{DD}$ level at a timing T12 in both FIGS. 12 and 13. In case of FIG. 12, the data becomes the $V_{DD}$ level at T12. On the other hand, the data does not come up to the VDD level at T12 in case of FIG. 13. Accordingly, a falling edge of a start bit for next communication is not completely formed.

Most part of a dullness in a waveform of a rising edge of data signal is caused by a resistance element such as pull-up resistor and the like. The resistance of the pull-up resistor 27 may be increased by the frequent insertion or removal of the IC card 10 into or from the IC card reader/writer 20. The resistance may be also increased by touch of the terminals 12 to 16 on the IC card with fingers. Since the resistance is different due to variations among the IC card reader/writer 20, it is difficult to eliminate a dullness of a data signal waveform.

A delay time tw caused by a dullness in a waveform of a data signal is represented by a formula using natural logarithm as follows:

$$tw = -Ln\{(V_{DD}-Vth)/V_{DD}\} \times C \times R$$

wherein C denotes capacitance of wiring and the like, R denotes the resistance of the pull-up resistor 27 and the like, and Vth denotes $0.7 \times V_{DD}$.

Assuming that C be 30 pF (a value recommended by ISO 7816), R be 20 Kohm (a value recommended by ISO 7816) and $V_{DD}$ be 5.5 V, then the tw is 720 nS(nanosecond).

At this time, the transfer rate is 103 µS. The delay time of 720 nS of 103 µS does not matter.

If the IC card is used at 4.91 MHz and 1228800 bps, a transfer rate of one bit is 810 nS as shown in FIG. 15. As a result, if a delay time of 720 nS should occur, erroneous detection of a signal, such as a data retransmitting request signal would then occur as mentioned above.

If the resistance R is doubled due to variations among the IC card reader/writers 20 and insertion and removal of the IC cards, then $$tw=1.44 \mu S$$

so that a maximum transfer rate would be reduced to 614400 bps.

Accordingly, it is necessary to provide another IC card reader/writer, designed to carry out data communication with a device such as JAVA card requiring high speed data communication, which is other than that for an IC card of low speed communication. However, provision of two sets of IC card reader/writers is wasteful. It has been demanded to make it possible to carry out data communication between an off the shelf IC card reader/writer and the JAVA card, etc.

It is therefore an object of the present invention to make it possible to carry out high rate data communication using an off the shelf IC card reader/writer.

In order to accomplish the object, in accordance with one aspect of the present invention, there is provided a card system wherein when data is transmitted and received over a signal line between an IC card and a card reader/writer for reading or writing of the data, a data transmitting side transmits a parity based upon content of the data together with the data over the signal line and a data receiving side checks whether or not there is any error in reception of data based upon content of the data and the parity received to transmit back to the data transmitting side a data retransmission request signal for requesting the data transmitting side to retransmit the data when there is an error; and wherein said IC card corrects a level of said signal line for requesting the data transmitting side to transmit next data when it is verified that there is no error in the reception of said data based upon content of said data and said parity received by the data receiving side.

In accordance with another aspect of the present invention, there is provided a card system wherein when data is transmitted and received over a signal line between an IC card and a card reader/writer for reading or writing of the data, a data transmitting side transmits a parity based upon content of the data together with the data over the signal line and a data receiving side checks whether or not there is any error in reception of data based upon content of the data and the parity received to transmit back to the data transmitting side a data retransmission request signal for requesting the data transmitting side to retransmit the data when there is an error; and wherein said IC card corrects a level of said signal line for requesting the data transmitting side to retransmit said data, after the receiving transmitting side transmits said data retransmission request signal.

In accordance with another aspect of the present invention, in case of said IC card being the data receiving side, the level of the signal line is corrected preferably during an interval from a reception of said parity to a reception of said data retransmission request signal by the data receiving side.

In case of said IC card being the data transmitting side, the level of said signal line is corrected preferably at a predetermined timing before next data is transmitted.

In accordance with another aspect of the present invention, there is provided an IC card used for a card system wherein when data is transmitted and received over a signal line between said IC card and a card reader/writer for reading or writing of the data, a data transmitting side transmits a parity based upon content of the data together with the data over the signal line and a data receiving side checks whether or not there is any error in reception of data based upon content of the data and the parity received to transmit back to the data transmitting side a data retransmission request signal for requesting the data transmitting side to retransmit the data when there is an error; and wherein said IC card corrects a level of said signal line for requesting the data transmitting side to transmit next data when it is verified that there is no error in the reception of said data based upon content of said data and said parity received by data receiving side.

In accordance with another aspect of the present invention, there is provided an IC card used for a card system wherein when data is transmitted and received over a signal line between said IC card and a card reader/writer for reading or writing of the data, a data transmitting side transmits a parity based upon content of the data together with the data over the signal line and a data receiving side checks whether or not there is any error in reception of data based upon content of the data and the parity received to transmit back to the data transmitting side a data retransmission request signal for requesting the data transmitting side to retransmit the data when there is an error; and wherein said IC card corrects a level of said signal line for requesting the data transmitting side to retransmit said data, after the receiving side transmits said data retransmission request signal.

In accordance with another aspect of the present invention, there is provided a card reader/writer for transmitting and receiving data being conducted for writing and reading of data thereto and therefrom, respectively.

Still other objects and advantages of the present invention will become readily apparent to those skilled in this art from the following detailed description, wherein only the preferred embodiment of the invention is shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

An embodiment of the present invention will now be described with reference to the drawings.

Figure 1:
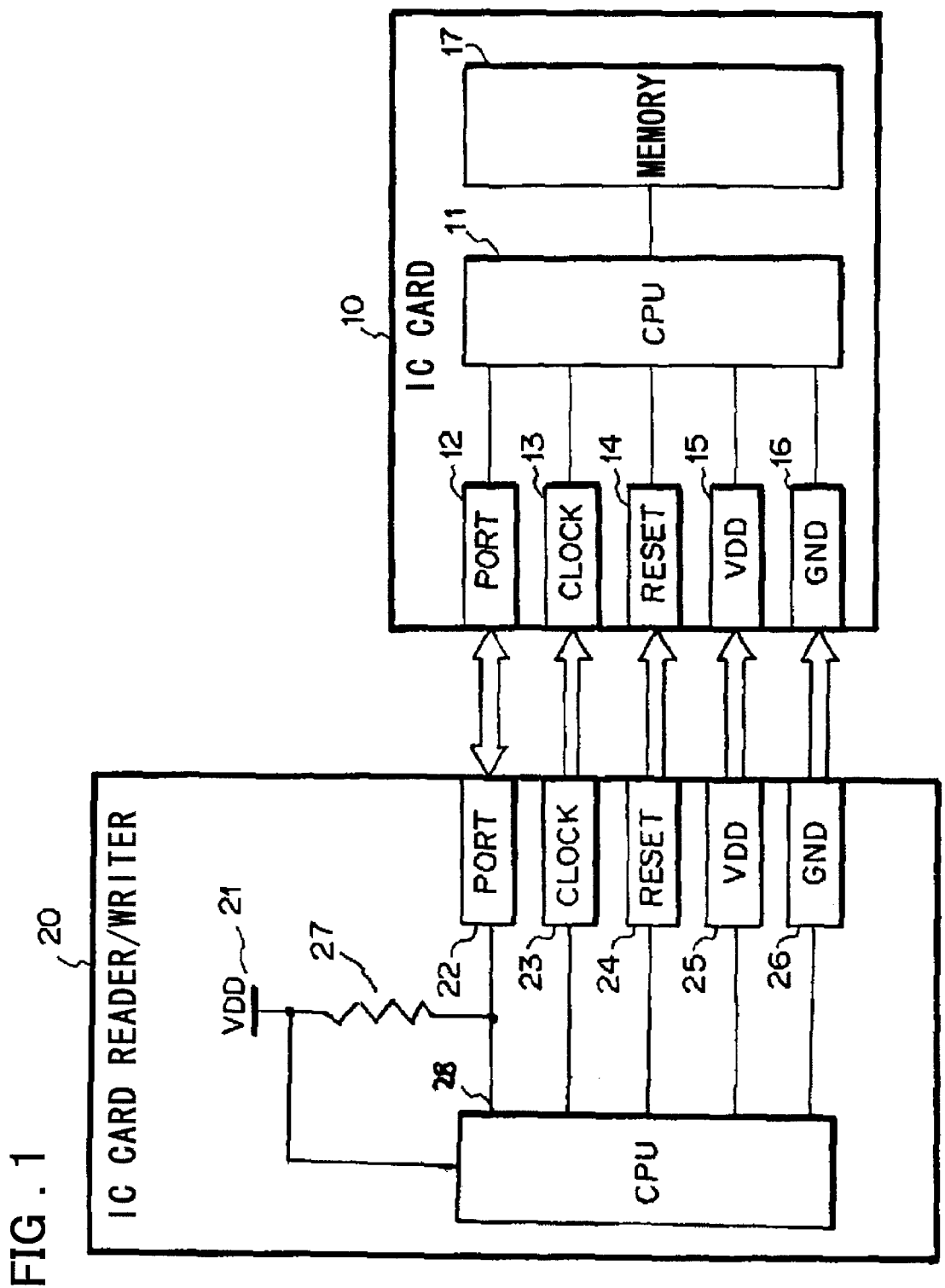
FIG. 1 is a block diagram showing an IC card and an IC card reader/writer which reads and records information from and on the IC card, respectively.

FIG. 1 illustrates a diagram showing structures of an IC card 10 and an IC card reader/writer 20 for reading information from the IC card 10 and/or recording information on the IC card 10. The IC card reader/writer 20 comprises a port terminal (PORT) 22 via which data is input and output, a clock terminal (CLOCK) 23 for outputting a clock signal for timing the input and output of the data, a reset terminal (RESET) 24 for outputting a reset signal which initiates the driving of a CPU 11 in the IC card 10, a power supply terminal (VDD) 25 for supplying power to drive the CPU 11 in the IC card 10 and a ground terminal (GND) 26.

The IC card reader/writer 20 further comprises a CPU 28 for controlling various signals which are output to terminals 22 to 26, a power supply 21 for driving the CPU 28 and a pull-up resistor 27 between the power supply 21 and the port terminal 22. The IC card 10 comprises terminals 12 to 16 which correspond to the terminals 22 to 26 of the IC card reader/writer 20, respectively, through which various signals are input to and output from the IC card 10. The IC card 10 further comprises a memory 17 for storing programs for conducting half-duplex synchronous communication and user data and a CPU 11 for executing the programs stored in the memory 17.

Figures 11A, 11B:
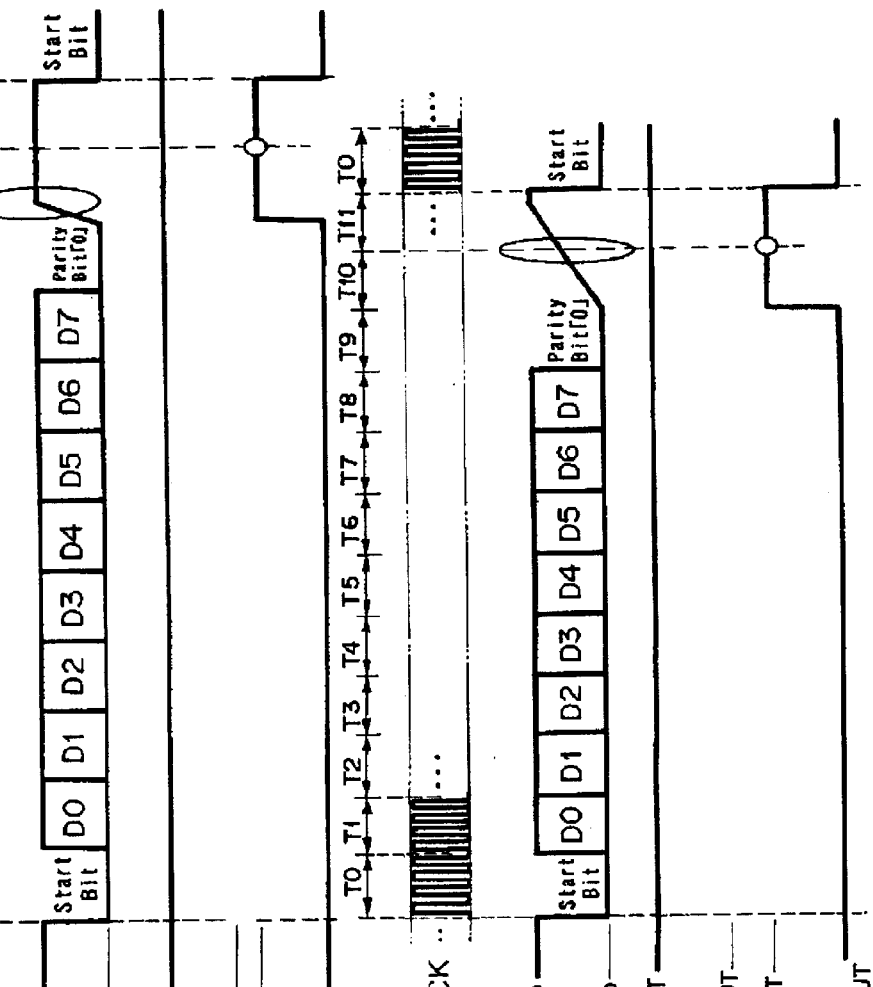
FIG. 11 is a diagram showing that no transmission and reception of the data retransmission request signal is conducted with the parity bits being "0".
Figure 12:
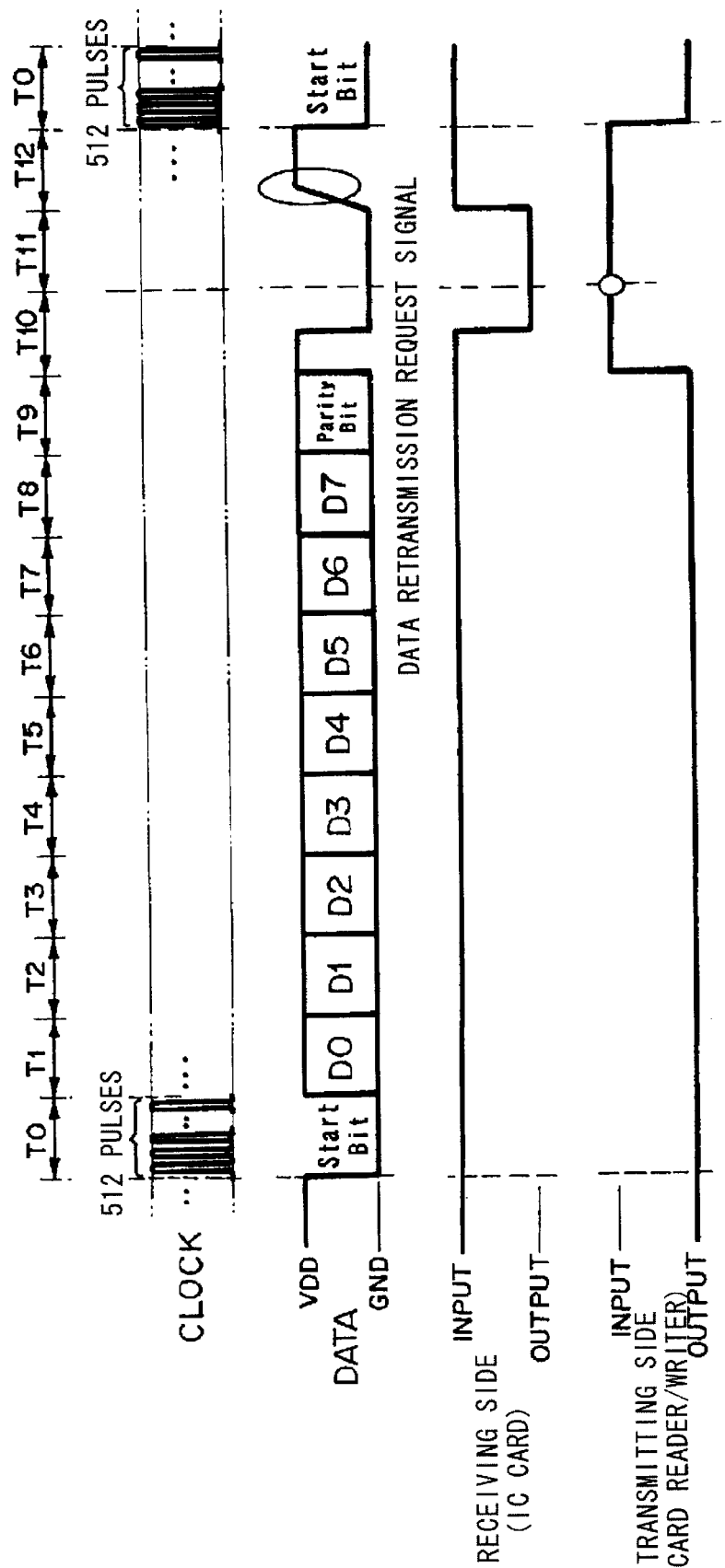
FIG. 12 is a diagram showing that a data retransmission request signal is transmitted at a low rate (for example, 9600 bps) with the parity bits being "1".
Figure 13:
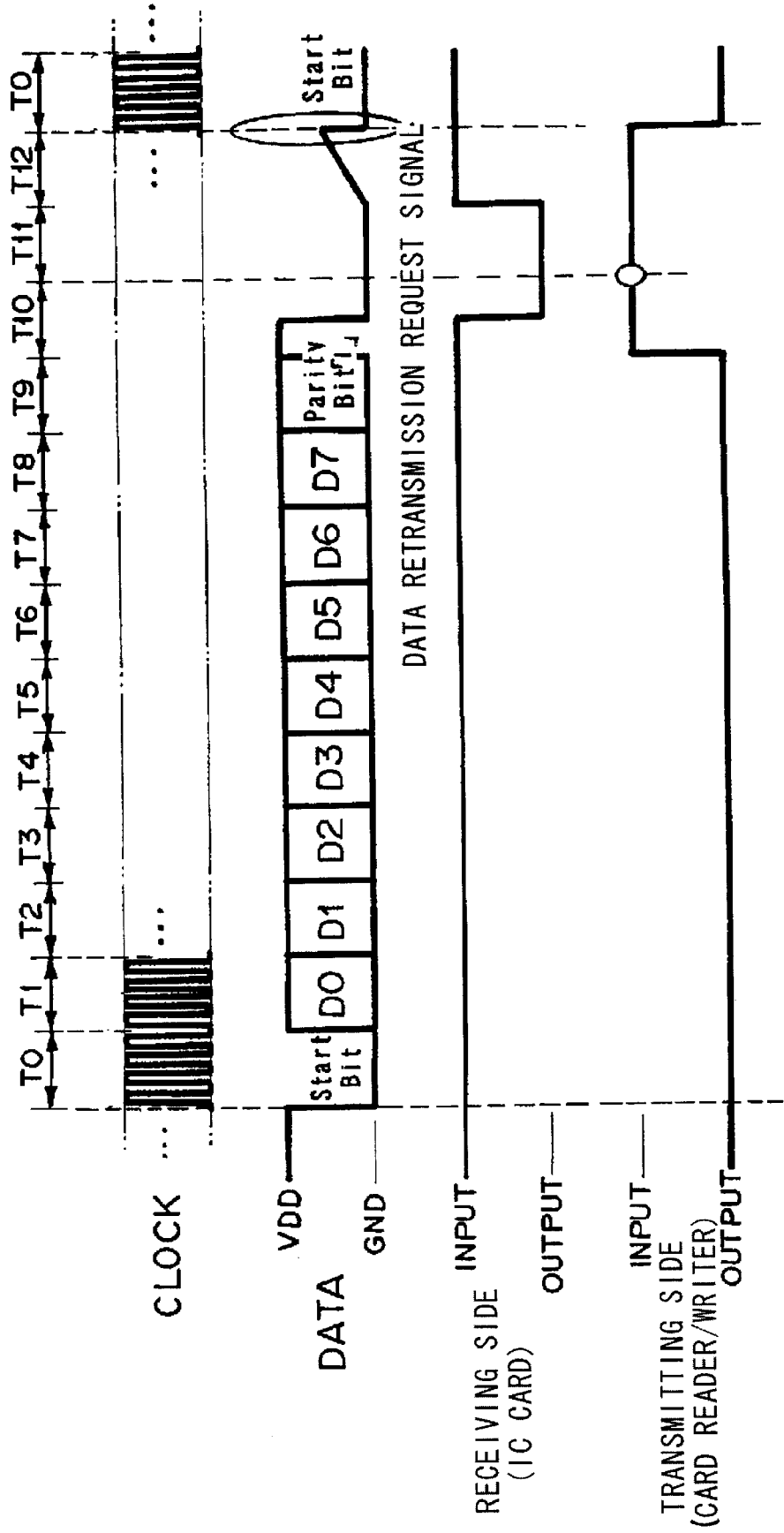
FIG. 13 is a diagram showing that a data retransmission request signal is transmitted at a high rate (for example, 1228800 bps) with the parity bits being "1".
Figure 14:
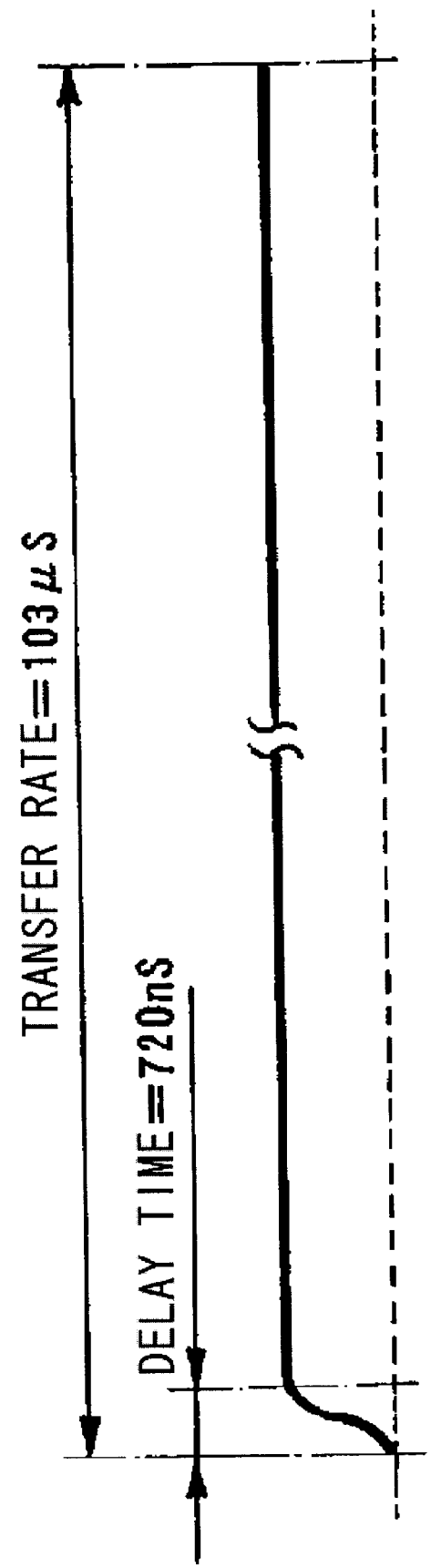
FIG. 14 is a diagram showing the data transfer rate and the delay time at a low rate.
Figure 15:
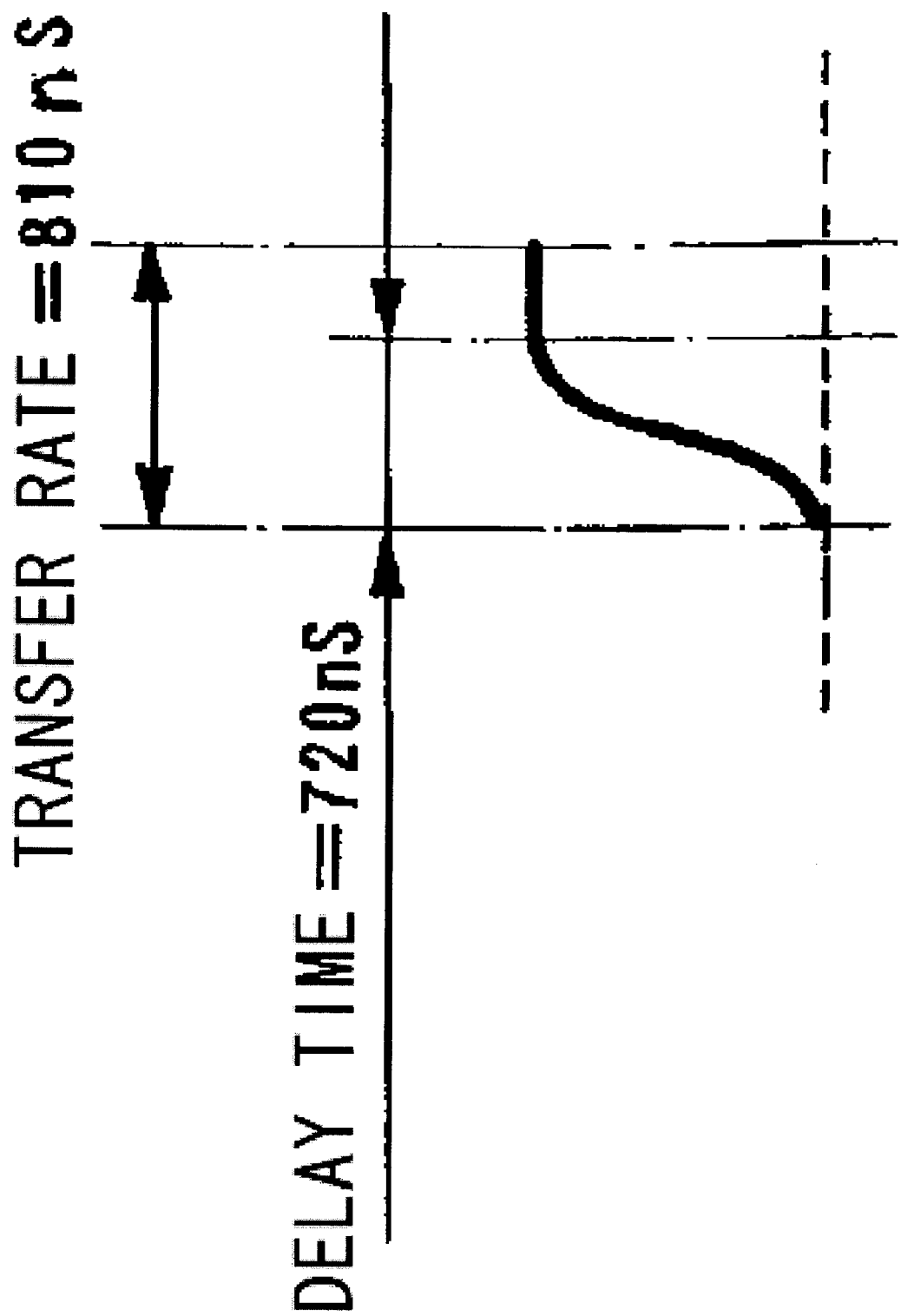
FIG. 15 is a diagram showing the data transfer rate and the delay time at a high rate.

The format, which has been described with reference to FIGS. 11 and 12, will be used for data communication in the present embodiment.

Figure 2:
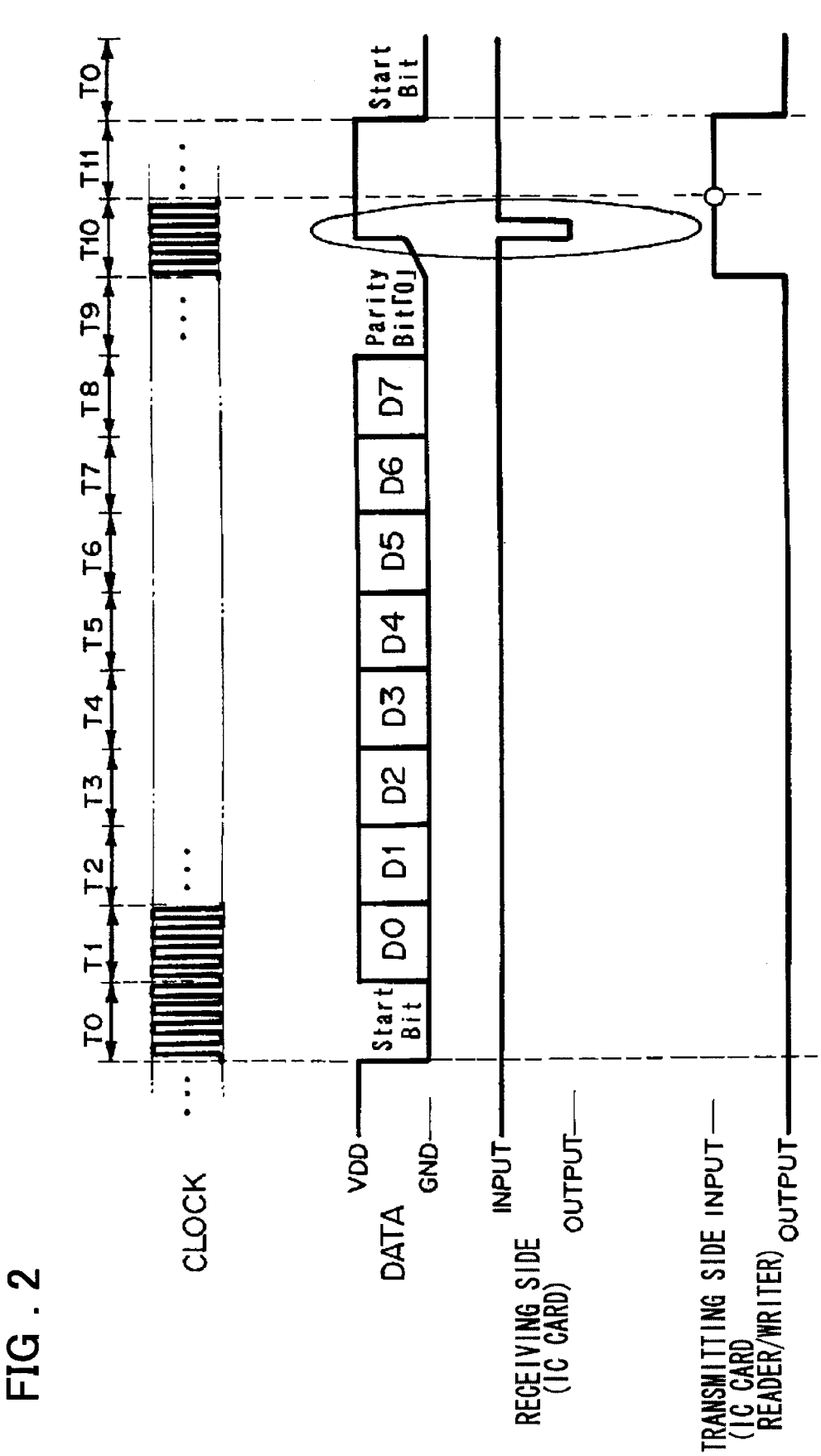
FIG. 2 is a diagram showing that data having a parity bit of "0" is transmitted at a high rate (for example, 1228800 bps), resulting in that there is no error in the data transmission.
Figure 3:
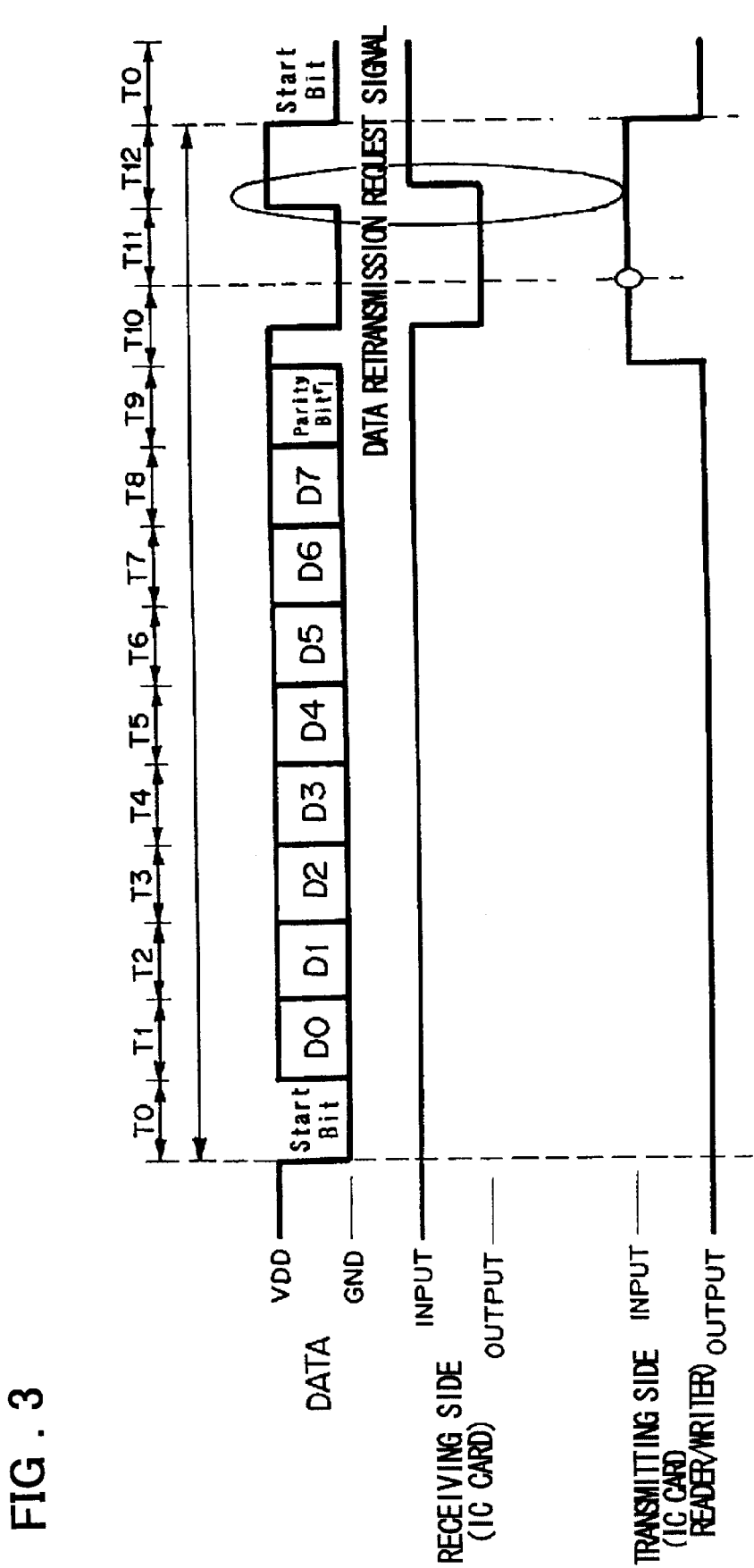
FIG. 3 is a diagram showing that data having a parity bit of "1" is transmitted at a high rate (for example, 1228800 bps), resulting in that there is an error in the data transmission.

FIG. 2 illustrates timing operation of the present embodiment in a case wherein data having a parity bit of "0" is transmitted at a high rate such as 1228800 bps, resulting in no error in data transmission. FIG. 3 illustrates timing operation of the present embodiment in a case wherein data having a parity bit of "1" is transmitted at a high rate (for example, 1228800 bps), resulting in an error in data transmission. In FIGS. 2 and 3, the IC card 10 is a receiving side and the IC card reader/writer 20 is transmitting side, respectively. In timing charts such as FIGS. 2 and 3, CLOCK and DATA illustrate timing waveforms of a clock signal and data, while INPUT and OUTPUT of a receiving side and a transmitting side indicate states of sides, taking input and output modes.

If a level of data is corrected at a timing as shown in FIG. 2 (see elliptical area in FIG. 2), detection of whether or not a data retransmission request signal has been received could be made correctly on the data transmitting side. If a level of data is corrected at a timing as shown in FIG. 3, a falling edge of a start bit for next communication could be formed.

Figure 4A:
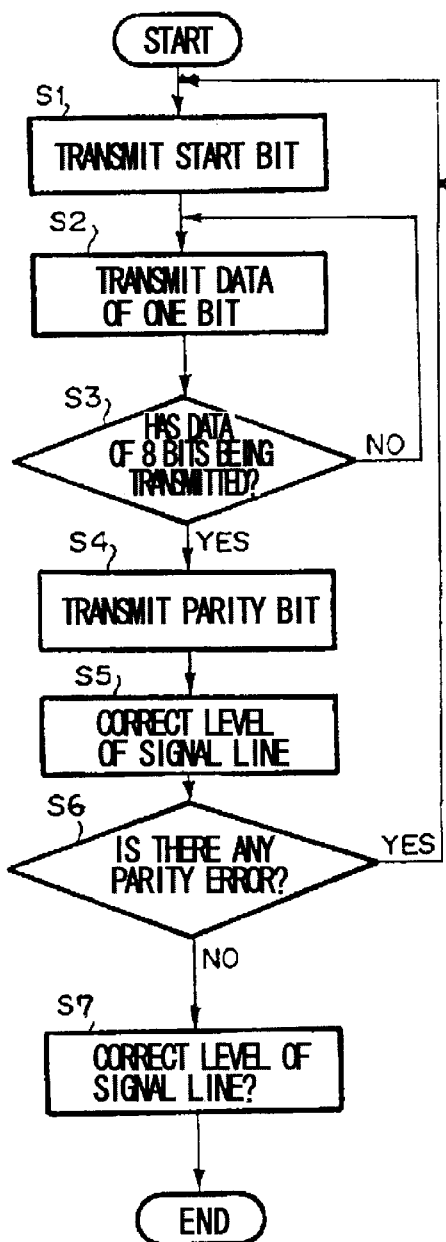
FIG. 4 is a flow chart shows the operation in FIGS. 2, 3, 5 and 6.
Figure 4B:
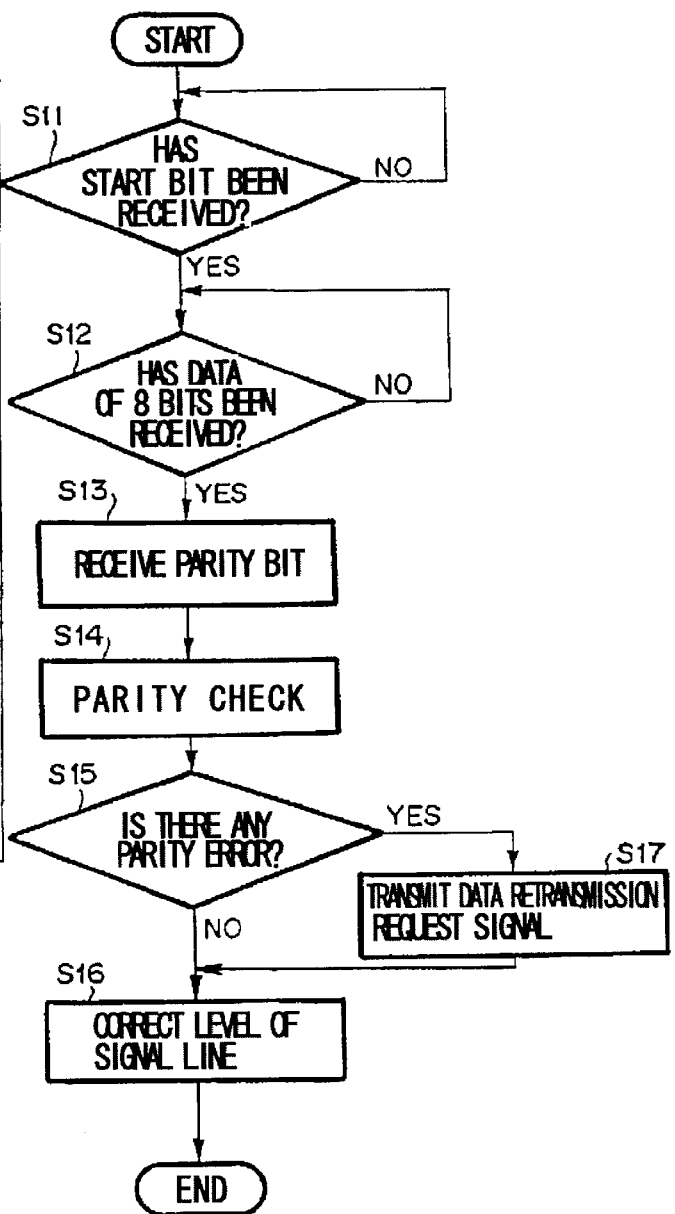
Figure 5:
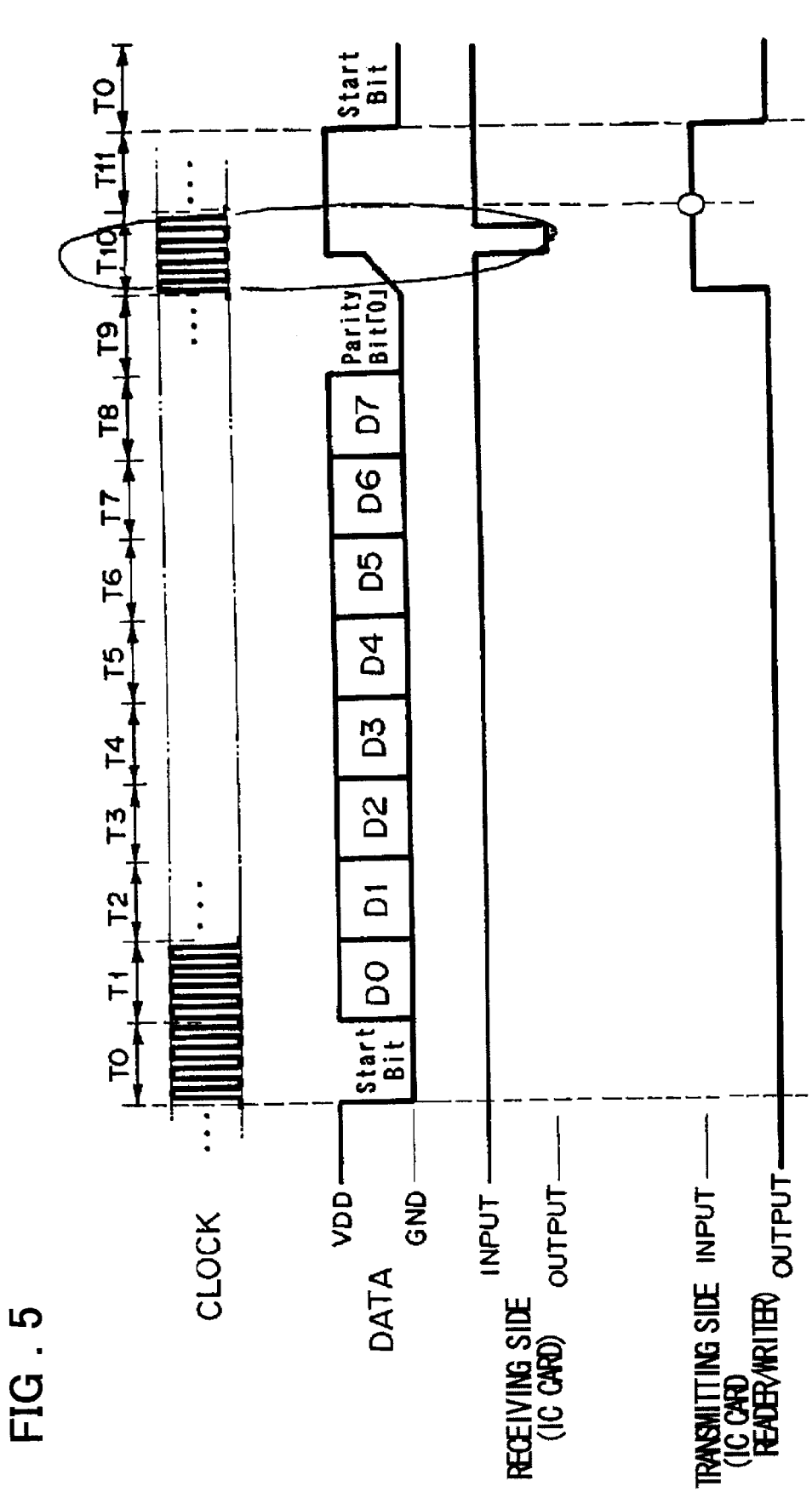
FIG. 5 is a diagram showing that the level of the signal line from CPU to power supply is corrected while the IC card is brought into the output mode for a period corresponding to two clock intervals.

The operation in FIG. 2 will now be described with reference to a flow chart of FIG. 4b. The IC card 10, which is functioning as a data receiving side checks whether or not a start bit has been, received (step S11). If it is verified that the start bit has been received, the program sequence will proceed to step S12, or otherwise the program sequence repeats step S11. At step S12, it is checked whether or not 8 bits data has been received. If it is verified that 8 bits data has been received, the program sequence will proceed to step S13, or otherwise repeats step S12.

At step S13, a parity bit is received and the parity check is executed based upon the received parity bit (step S14). Since there is no error in the data (step S15), the IC card 10 is switched to an output mode in response to, for example, a third clock of T10 in accordance with the clock signal. In order to request the transmission of next data by changing a level of the data to a $V_{DD}$ level, a level of a signal line from CPU 11 to CPU 28 is corrected to a voltage level such as $V_{DD}$ (see elliptical area in FIG. 2) at step S16. The level of the signal line from CPU 11 to CPU 28 is set to the $V_{DD}$ level under a control of the CPU 11 of the IC card 10.

Thus, the voltage level of the signal line is corrected to the $V_{DD}$ level within a period of T10, as a result of which, it can be detected that a retransmission of the data has not been requested since the signal line level is at a $V_{DD}$ level when the data is actually input by the IC card reader/writer 20. A $V_{DD}$ level means a voltage level of a power supply voltage $V_{DD}$. In a logic system for use in a binary data communication, $V_{DD}$ level is also termed High level while a Ground level is termed Low level.

Although the IC card is switched to an output mode in response to a third clock at T10, theoretically the level of the signal line from CPU 11 to CPU 28 may be changed to a level such as the $V_{DD}$ level by bringing the IC card 10 into an output mode for a period corresponding to at least one clock interval prior to T11. However, there may be such a case in which an error during an operation of data communication occurs in the IC card reader/writer 20 which is a data transmitting side, so that the data is input before a first clock at T11.

In this case, even if the IC card 10 is switched to an output mode in for example, a fourth clock at T10, presence/absence of a data retransmission request signal can be accurately detected. Hence, the IC card 10 is brought into an output mode in response to the third clock at T10.

Although the level of the signal line from CPUs 11 to 28 is changed to a level such as the $V_{DD}$ level while the IC card 10 is brought into an output mode for a period corresponding to one clock interval, the signal line level may be corrected while the IC card is brought into an output mode for a period corresponding to, for example, two clock intervals.

Since both the IC card 10 and IC card reader/writer 20 are not simultaneously brought into output modes even if control is conducted to transmit and receive the data as shown in FIG. 2, the operation does not violate a half-duplex communication scheme.

Now, the operation in FIG. 3 will be described with reference to FIG. 4b. Steps 11 through 14 are executed as is similar to those in FIG. 2. When it is verified that there is an error in data transmission at step S15, a program sequence will proceed to step S17, at which a data retransmission request signal is transmitted for a period, for example, from a second clock at T10 to a fourth clock at T11. Then, a voltage level of the signal line from CPUs 11 to 28 is brought into a level such as the $V_{DD}$ level in response to a first clock at T12 (elliptical area in FIG. 3).

Figure 6:
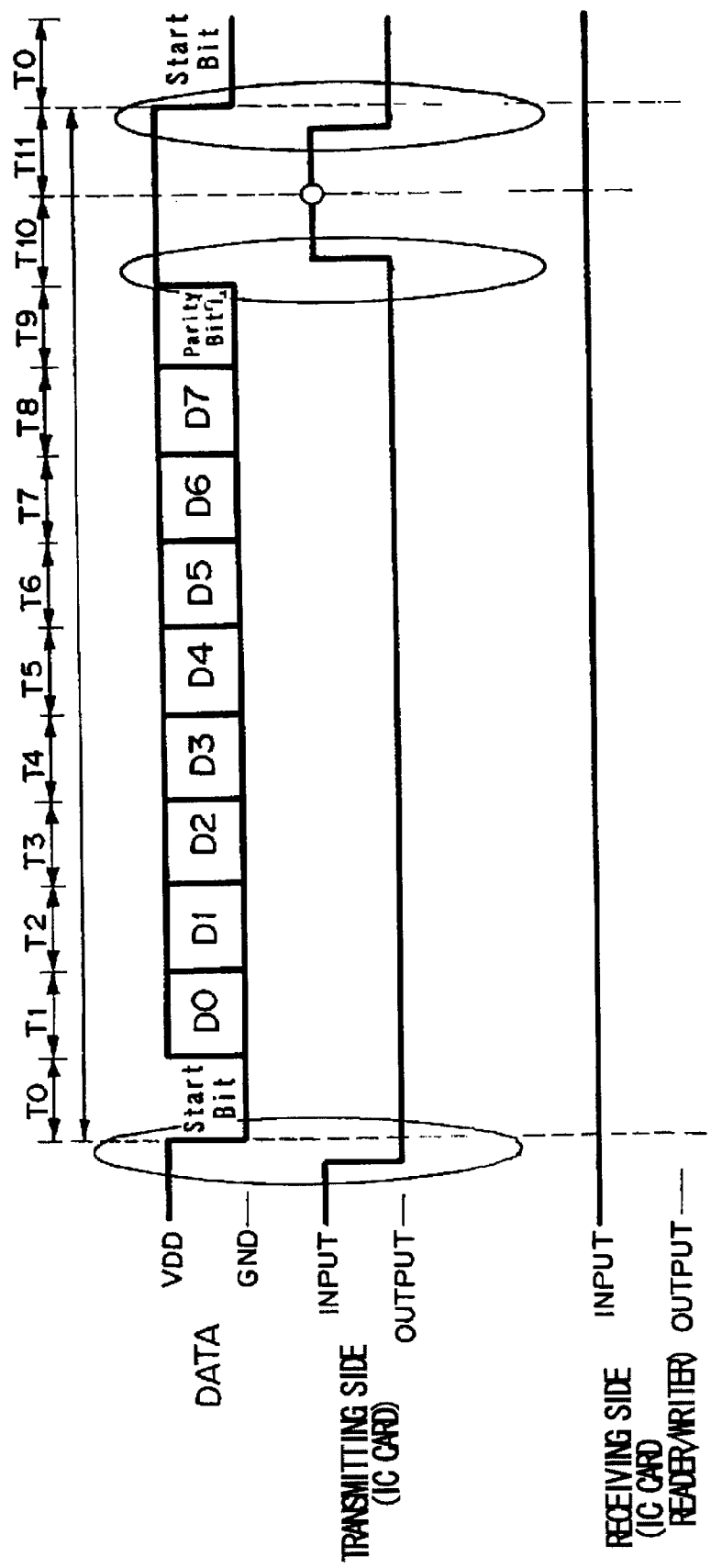
FIG. 6 is a diagram showing that data having a parity bit of "1" is transmitted at a high rate (for example, 1228800 bps), resulting in that there is no error in the data transmission.
Figure 7:
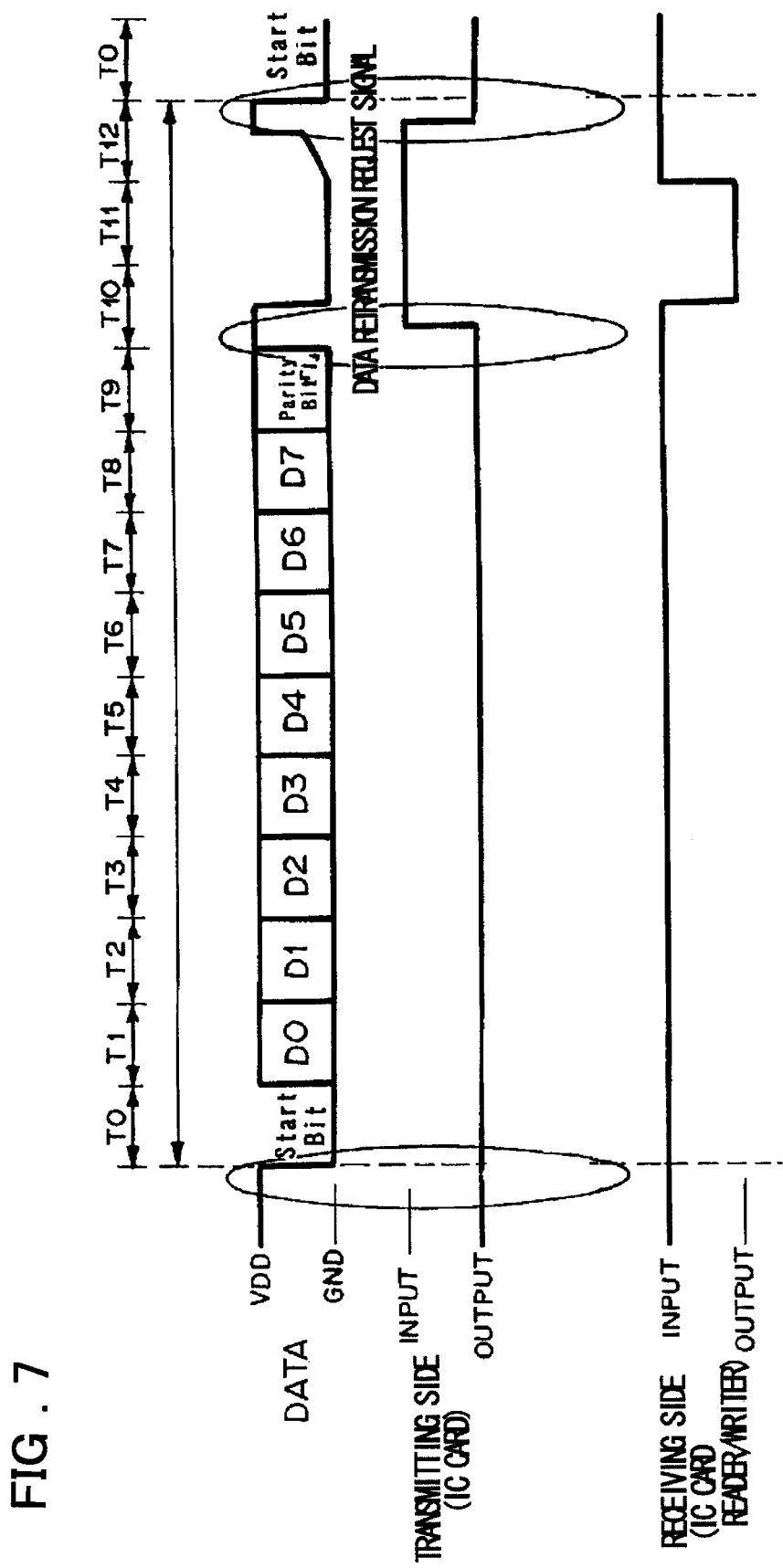
FIG. 7 is a diagram showing that data having a parity bit of "1" is transmitted at a high rate (for example, 1228800 bps), resulting in that there is an error in the data transmission.
Figure 8:
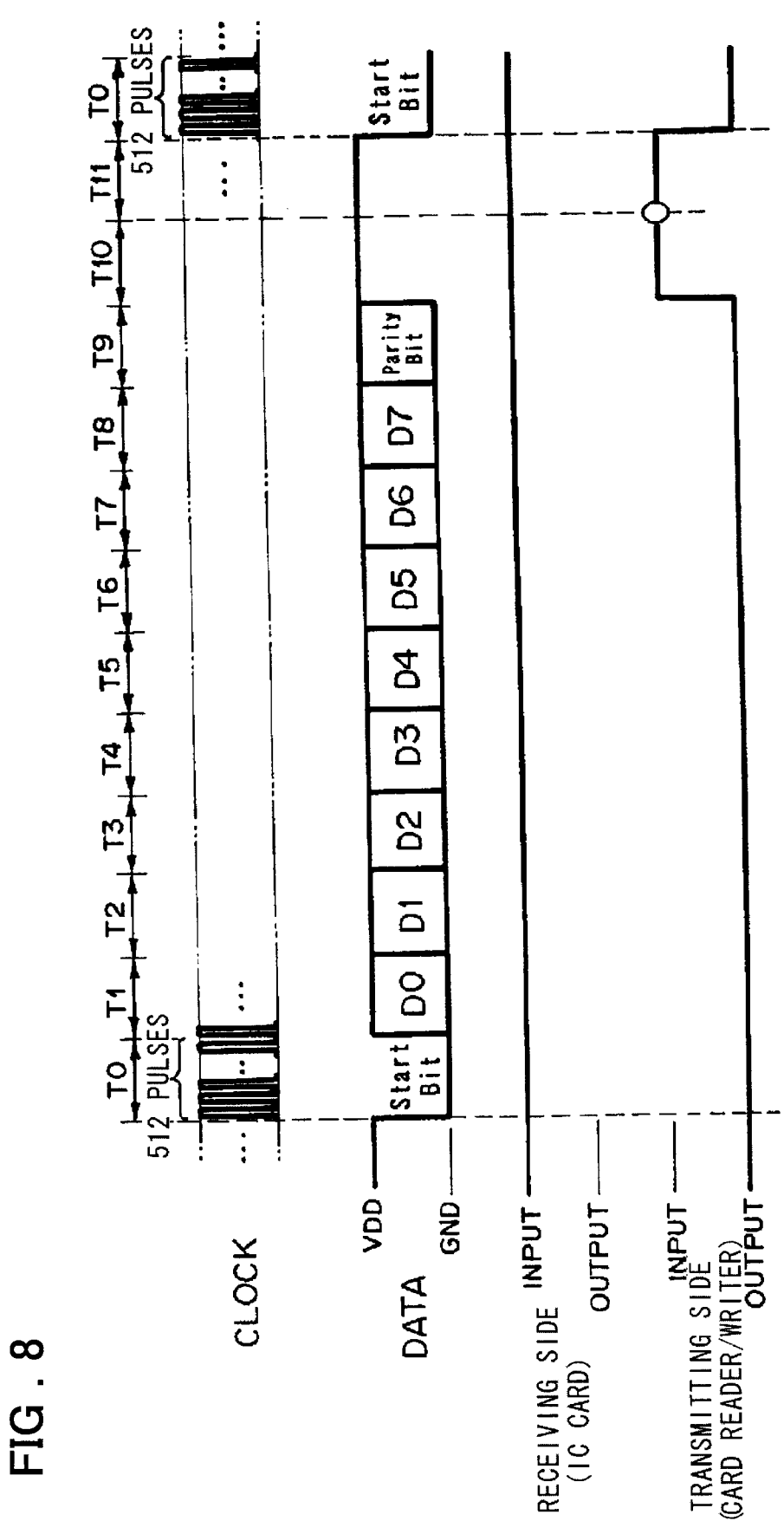
FIG. 8 is a diagram showing the format of the data used for half-duplex synchronous communications when the data communications are normally conducted.
Figure 9:
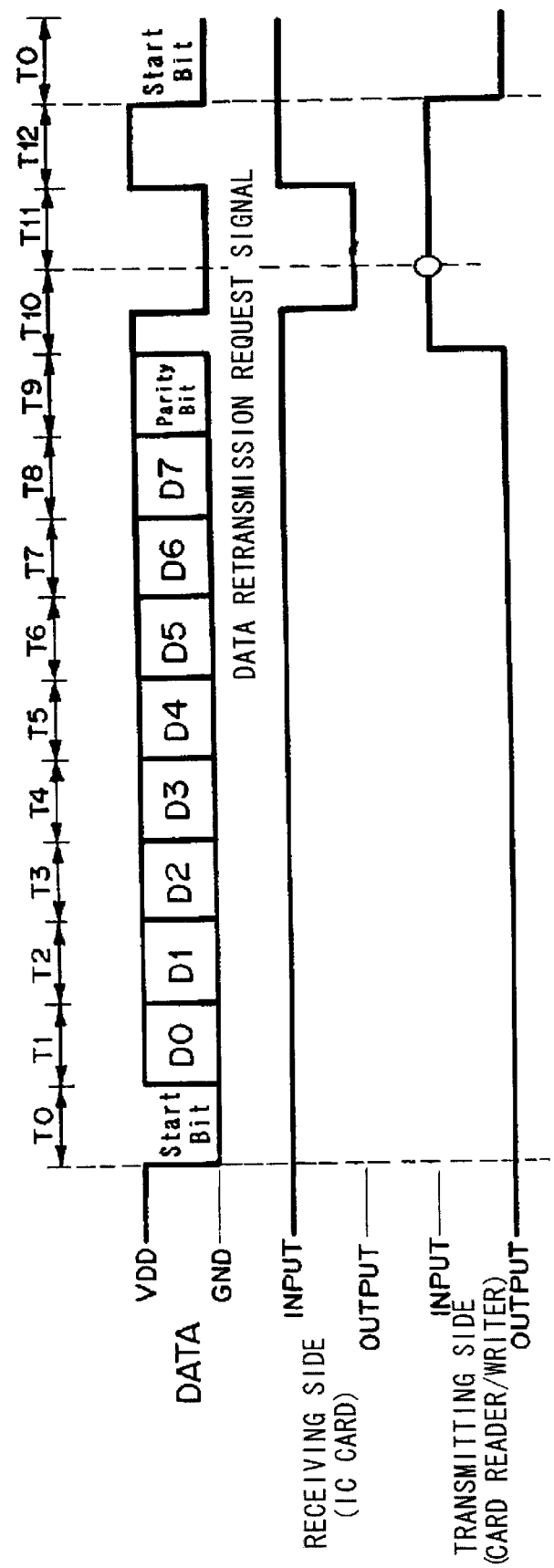
FIG. 9 is a diagram showing the format of the data used for half-duplex synchronous communications when the data communications are not normally conducted.
Figure 10:
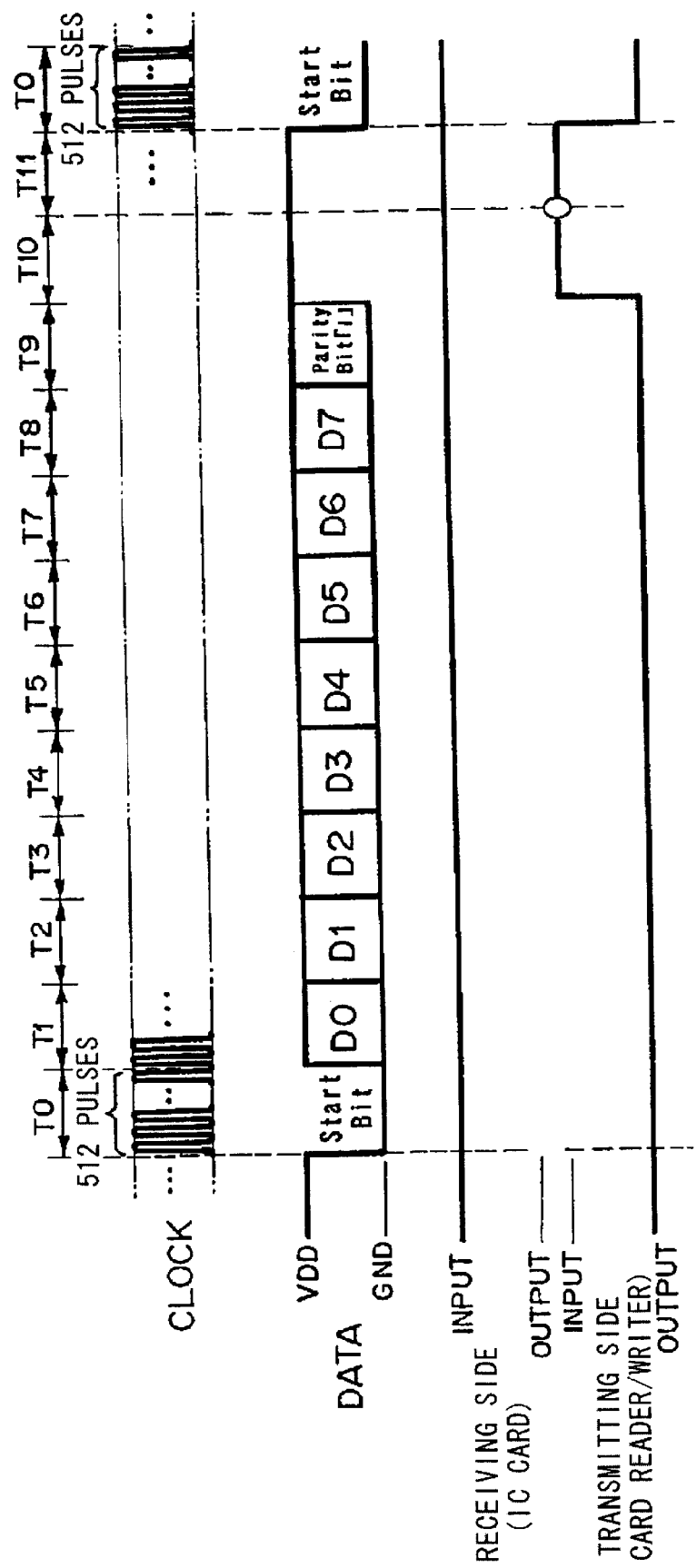
FIG. 10 is a diagram showing that no data retransmission request signal is transmitted and received with the parity bits being "1" and that the data communications are conducted at, for example, 1228800 bps.

FIG. 6 illustrates an operation of the present embodiment in a case wherein data having a parity bit of "1" is transmitted at a high rate such as 1228800 bps using the format shown in FIG. 10, resulting in no error in data transmission. FIG. 7 illustrates an operation of the present embodiment wherein data having a parity bit of "1" is transmitted at a high rate such as 1228800 bps using the format shown in FIG. 9, resulting in an error in data transmission. In FIGS. 6 and 7, it is assumed that the IC card 10 is a receiving side and the IC card reader/writer 20 is a transmitting side.

The operation in FIGS. 6 and 7 will now be described with reference to a flow chart of FIG. 4a. The IC card 10 which is a data transmitting side transmits a start bit (step S1) and then transmits data of one bit (step S2). At step S3, it is checked whether 8 bits of data have been transmitted. If it is verified that 8 bits of data have been transmitted, the program sequence will proceed to step S4, or otherwise return to step S2.

A parity bit is transmitted at step S4. Then, after transmission of the parity bit, the IC card 10 is brought into an output mode for a period corresponding to one clock interval (first clock at T10) and the $V_{DD}$ level is maintained by correcting the level of the signal line from CPUs 11 to 28 to a level such as the $V_{DD}$ level (step S5). Then the IC card 10 is switched to the input mode in response to the second clock at T10.

Subsequently, it is checked whether the data has any error (step S6). If it is verified that there is an error, a program sequence will return to step S1, and if it is verified that there is no error, the IC card 10 is switched to an output mode in response to, for example, a fourth clock at T11, so that the data is changed to the $V_{DD}$ level by correcting the level of the signal line again (step S7). If there is an error in data, a data retransmission request signal is transmitted as shown in FIG. 7.

The IC card 10 which is a data transmitting side makes it possible to make an enough timing margin to form a falling edge of a start bit for a next communication by changing the level of the signal line twice to change the data to $V_{DD}$ level within T10 and T11 irrespective of the presence or absence of the data transmission. The purpose of correcting the level of the signal line within T10 is to make the data to the $V_{DD}$ level by a first clock at T11 if a parity bit is "0" as is similar to correction at step S16 in FIG. 4b.

The meritorious effects of the present invention are summarized as follows. In accordance with the present invention as described above, since the IC card corrects the level of the signal line for transmitting data toward a data transmitting side after a data receiving side transmits a data retransmission request signal, it is possible to transmit and receive the data retransmission request signal while data is in, for example, $V_{DD}$ level. Erroneous reception of this signal can be prevented.

In accordance with the present invention, since after a data receiving side transmits a data retransmission request signal, the IC card corrects the level of the signal line to transmit data which has not been completely transmitted and received, to a data transmitting side, it is possible to transmit that data again.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A card system comprising an integrated circuit (IC) card having a port terminal to be electrically connected to a port terminal of a card reader/writer for transmitting and receiving data over a signal line between said IC card and said card reader/writer to read data from or write data to said IC card, said card system comprising:

a data transmitting side, which is one of said IC card and said card reader/writer, transmitting a parity based upon content of the data together with the data over the signal line;

a data receiving side, which is another of said IC card and said card reader/writer, checking whether or not there is any error in reception of data based upon content of the data and the parity received, said data receiving side further transmitting back to the data transmitting side a data retransmission request signal for requesting the data transmitting side to retransmit the data to said data receiving side when an error in the reception of data is detected; and said IC card correcting a voltage level of said signal line to enable the data receiving side to request the data transmitting side to transmit next data to the data receiving side when it is verified that there is no error in the reception of said data based upon content of said data and said parity received by the data receiving side, wherein transmission and reception of data over the signal line is enabled at a transmission rate for which voltage delay time on the signal line that corresponds to a predetermined voltage level for transmission and reception of data over the signal line exceeds data delay time that corresponds to input of data to be transmitted at the predetermined voltage level over the signal line.

2. The card system as defined in claim 1, wherein in case of said IC card being the data receiving side, the voltage level of the signal line is corrected during an interval from a reception of said parity by the data receiving side to a reception of said data retransmission request signal by the data transmitting side.

3. The card system as defined in claim 1, wherein the transmission rate is 1,228,800 bits/second.

4. A card system comprising an integrated circuit (IC) card having a port terminal to be electrically connected to a port terminal of a card reader/writer for transmitting and receiving data over a signal line between said IC card and said card reader/writer to read data from or write data to said IC card, said card system comprising:

a data transmitting side, which is one of said IC card and said card reader/writer, transmitting a parity based upon content of the data together with the data over the signal line;

a data receiving side, which is another of said IC card and said card reader/writer, checking whether or not there is any error in reception of data based upon content of the data and the parity received, said data transmitting side further transmitting back to the data transmitting side a data retransmission request signal for requesting the data transmitting side to retransmit the data to said data receiving side when an error in the reception of data is detected; and said IC card correcting a voltage level of said signal line to enable the data receiving side to request the data transmitting side to retransmit said data to the data receiving side, after the data receiving side transmits said data retransmission request signal to the data transmitting side, wherein transmission and reception of data over the signal line is enabled at a transmission rate for which voltage delay time on the signal line that corresponds to a predetermined voltage level for transmission and reception of data over the signal line exceeds data delay time that corresponds to input of data to be transmitted at the predetermined voltage over the signal line.

5. The card system as defined in claim 4, wherein in case of said IC card being the data transmitting side, the voltage level of said signal line is corrected at a predetermined timing before next data is transmitted from the data transmitting side to the data receiving side.

6. The card system as defined in claim 4, wherein the transmission rate is 1,228,800 bits/second.

7. An integrated circuit (IC) card for use in a card system comprising a card reader/writer having a port terminal to be electrically connected to a port terminal port of said IC card for transmitting and receiving data over a signal line between said IC card and a card reader/writer to read data from or write data to said IC card, said card system comprising a data transmitting side, which is one of said IC card and said card reader/writer, for transmitting a parity based upon content of the data together with the data over the signal line, and a data receiving side, which is another of said IC card and said card reader/writer, for checking whether or not there is any error in reception of data based upon content of the data and the parity received, said data receiving side for further transmitting back to the data transmitting side a data retransmission request signal to request the data transmitting side to retransmit the data to said data receiving side when an error in the reception of data is detected, said IC card comprising:

a means for correcting a voltage level of said signal line to enable the data receiving side to request the data transmitting side to transmit next data when it is verified that there is no error in the reception of said data based upon content of said data and said parity received by the data receiving side, wherein transmission and reception of data over the signal line is enabled at a transmission rate for which voltage delay time on the signal line that corresponds to a predetermined voltage level for transmission and reception of data over the signal line exceeds data delay time that corresponds to input of data to be transmitted at the predetermined level over the signal line.

8. The integrated circuit (IC) card for use in a card system comprising a card reader/writer as defined in claim 7, said card reader/writer comprising means for transmitting and receiving data for writing and reading the data to and from said IC card.

9. The integrated circuit (IC) for use in a card system as defined in claim 7, wherein the transmission rate is 1,228,800 bits/second.

10. An integrated circuit (IC) for use in a card system comprising a card reader/writer having a port terminal to be electrically connected to a port terminal of said IC card for transmitting and receiving data over a signal line between said IC card and a card reader/writer to read data from or write data to said IC card, said card system comprising a data transmitting side, which is one of said IC card and said card reader/writer, for transmitting a parity based upon content of the data together with the data over the signal line, and a data receiving side, which is another of said IC card and said card reader/writer, for checking whether or not there is any error in reception of data based upon content of the data and the parity received, said data receiving side further for transmitting back to the data transmitting side a data retransmission request signal to request the data transmitting side to retransmit the data to said data receiving side when an error in the reception of data is detected, said IC card comprising:

a means for correcting a voltage level of said signal line to enable the data receiving side to request the data transmitting side to retransmit said data to the data receiving side, after the data receiving side transmits said data retransmission request signal to the data transmitting side, wherein transmission and reception of data over the signal line is enabled at a transmission rate for which voltage delay time on the signal line that corresponds to a predetermined voltage level for transmission and reception of data over the signal line exceeds data delay time that corresponds to input of data to be transmitted at the predetermined voltage level over the signal line.

11. The integrated circuit (IC) card for use in a card system comprising a card reader/writer as defined in claim 10, said card reader/writer comprising means for transmitting and receiving data for writing and reading the data to and from said IC card.

12. The integrated circuit (IC) for use in a card system as defined in claim 10, wherein the transmission rate is 1,228,800 bits/second.

13. A card system comprising an integrated circuit (IC) card and a card reader/writer, said IC card comprising at least a CPU, a memory for storing a program and/or data, a port terminal for data input and output, a terminal for receiving a clock signal, and a plurality of power supply terminals, said terminals being connected to said CPU of said IC card, said card reader/writer comprising at least a CPU, a port terminal for data input and output, a terminal for providing a clock signal, and a plurality of power supply terminals for supplying a power and a ground, said terminals being connected to said CPU of said card reader/writer, each of said terminals of said IC card to be elecirically connected to a corresponding terminal of said card reader/writer when said IC card is mounted on said card reader/writer, said card system comprising:

a data transmitting side, which is one of said IC card and said card reader/writer, transmitting a data comprised of a series of data bits accompanied by an error chek code over a signal line arranged between said CPU of said IC card and said CPU of said card reader/writer through said port terminal of said IC card and said port terminal of said card reader/writer, said error check code calculated based on content of the data bits;

a data receiving side, which is another of said IC card and said card reader/writer, checking for any error in reception of data by calculating an error check code based upon content of the data bits received and comparing the calculated error check code with said received error check code, said data receiving side further transmitting back to the data transmitting side a data retransmission request signal for requesting the data transmitting side to retransmit the data to said data receiving side when an error in the reception of data is detected; and said IC card comprising means for correcting a voltage level of said signal line to a predetermined voltage level, when it is verified by the data receiving side that there is no error in the reception of said data based upon said error check code, said correction of the voltage level of said signal line causing the data transmitting side to correctly detect that a data retransmission request signal from the data receiving side is not transmitted at a timing of inputting next data to said signal line by the data transmitting side, wherein transmission and reception of data over the signal line is enabled at a transmission rate for which voltage delay time on the signal line that corresponds to the predetermined voltage level for transmission and reception of data over the signal line exceeds data delay time that corresponds to input of data to be transmitted at the predetermined voltage level over the signal line.

14. The card system as defined in claim 13, wherein said IC card further comprises means for correcting a voltage level of said signal line after the data receiving side transmits said data retransmission request signal to request the data transmitting side to retransmit said data to the data receiving side.

15. The card system as defined in claim 13, wherein said IC card further comprises means for correcting the voltage level of the signal line during an interval from a reception of said error check code by the data receiving side to a reception of said data retransmission request signal by the data transmitting side, in case of said IC card being the data receiving side.

16. The card system as defined in claim 13, wherein said IC card further comprises means for correcting the voltage level of said signal line at a predetermined timing before next data is transmitted from the data transmitting side to the data receiving, in case of said IC card being the data transmitting side.

17. The card system as defined in claim 13, wherein said error check code comprises a parity bit.

18. The card system as defined in claim 13, wherein a start bit is transmitted on the signal line ahead of said data bits from the data transmitting side to the data receiving side.

19. The card system as defined in claim 13, wherein the transmission rate is 1,228,800 bits/second.

* * * * *